GENERATOR OF PARITY CHECK BITS

Filed Feb. 7, 1962 3 Sheets-Sheet 1

● data bits ○ check bits
minimum Hamming distance 4 m = 15
K = 5
minimum Hamming distance 3 m = 15
K = 6
minimum Hamming distance 4

INVENTOR
HANS MARKO
BY Philip M. Bolton
ATTORNEY

Feb. 8, 1966 H. MARKO 3,234,364

GENERATOR OF PARITY CHECK BITS

Filed Feb. 7, 1962 3 Sheets-Sheet 2

INVENTOR
HANS MARKO

BY Philip M. Bolton
ATTORNEY

Feb. 8, 1966 H. MARKO 3,234,364
GENERATOR OF PARITY CHECK BITS
Filed Feb. 7, 1962 3 Sheets-Sheet 3

INVENTOR
HANS MARKO
BY Philip M. Bolton
ATTORNEY

United States Patent Office 3,234,364

Patented Feb. 8, 1966

3,234,364

GENERATOR OF PARITY CHECK BITS

Hans Marko, Stuttgart-Stammheim, Germany, assignor to International Standard Electric Corporation, New York, N.Y., a corporation of Delaware Filed Feb. 7, 1962, Ser. No. 171,767
15 Claims. (Cl. 235—153)

Figure 1:
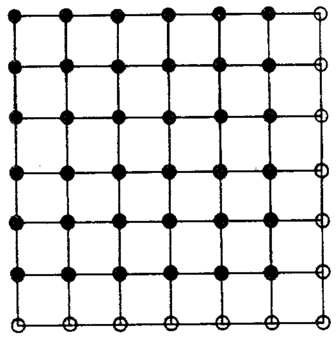

For the purpose of transmitting data without appreciable errors via noisy communication channels it is known to use a retransmission system wherein the binary elements to be transmitted are provided at the transmitting end with redundant check symbols (digits), and wherein a predetermined number of errors appearing during the transmission is detected at the receiving end. A code with the minimum Hamming distance of 4 digits, for example, is capable of detecting up to three errors. Whenever it is intended to obtain relatively high Hamming distances, such as 4, it will be necessary to employ message blocks, because the coding of a character comprising a small number of digits requires a too high redundancy. FIG. 1 shows a block coding scheme, by which it is possible to obtain the Hamming distance 4. The digits carrying the message information can be thought of being arranged in the form of a matrix. These binary digits (bits) of the message are indicated in FIG. 1 by the black dots, whereas the check symbols are indicated by the tiny white circles. There is performed a parity check of the rows and columns. It will be seen that at first four or more errors remain undetectable, whereas up to three errors are detectable. If, for example, in the case of a teleprinter system, a complete type-written line consisting of 72 letters of the alphabet or 360 binary digits (bits) is supposed to be checked in this way, it will be found that the number of check symbols to be transmitted is a very large one, namely about 38. Moreover, this method has the disadvantage of being bound to a predetermined block length.

It is one object of the present invention to provide an arrangement for carrying out an error-detecting method ensuring a particularly favourable ratio between redundancy and the minimum Hamming distance.

Accordingly, the invention relates to an error-detecting method for the use in data-transmission systems wherein, with respect to the transmitted or received message blocks (blocks of data bits), parity check symbols are ascertained at both of the communicating stations with the aid of binary counters, for being transmitted in one direction, preferably in the data-transmission direction, from the one station to the other, and wherein the identity of the parity digits or symbols is checked at the station receiving the parity digits from the opposite station.

The set objective is attained in that the serial data are fed in parallel to binary counters, i.e.—with the exception of the last counter—via preordinated coincidence gates which, on the other hand, are connected to the outputs of the individual stages of a binary dividing chain which is supplied with clock-pulse signals in synchronism with the digit sequence, and from which they receive the opening pulses, so that the binary counters perform the counting of successive bits of groups, and beginning with one such group, between which there are provided intervals of equal duration, whereby the number of digits in the groups or intervals increasing from counter to counter increases by the powers of two starting with a 0 exponent, for instance, $2^0$, $2^1$, $2^2$, $2^3$, and switches are provided for performing the successive interrogation and transmission of the reading (counter condition) in the form of check symbols subseqeuntly to the transmission of a data (message) block.

Arrangements according to further embodiments of the invention serve to make certain discrete numbers of errors detectable that are due to immediate successively following errors, and are especially likely to appear on account of an interruption, although they are not detectable per se in accordance with the given basic system; in other words: to increase the minimum Hamming distance with respect to immediately successive errors.

Figure 4:
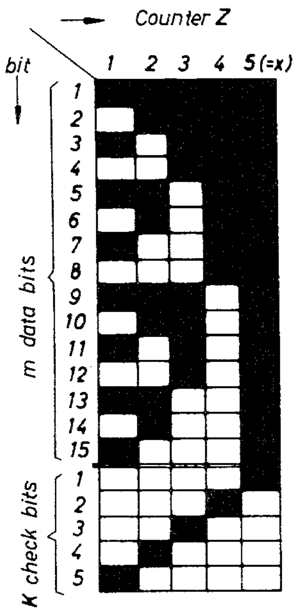
Figure 5:
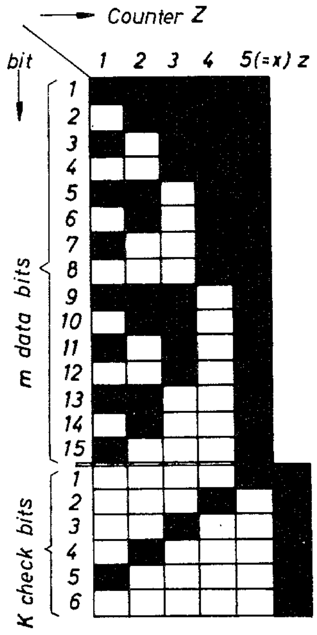
Figure 2:
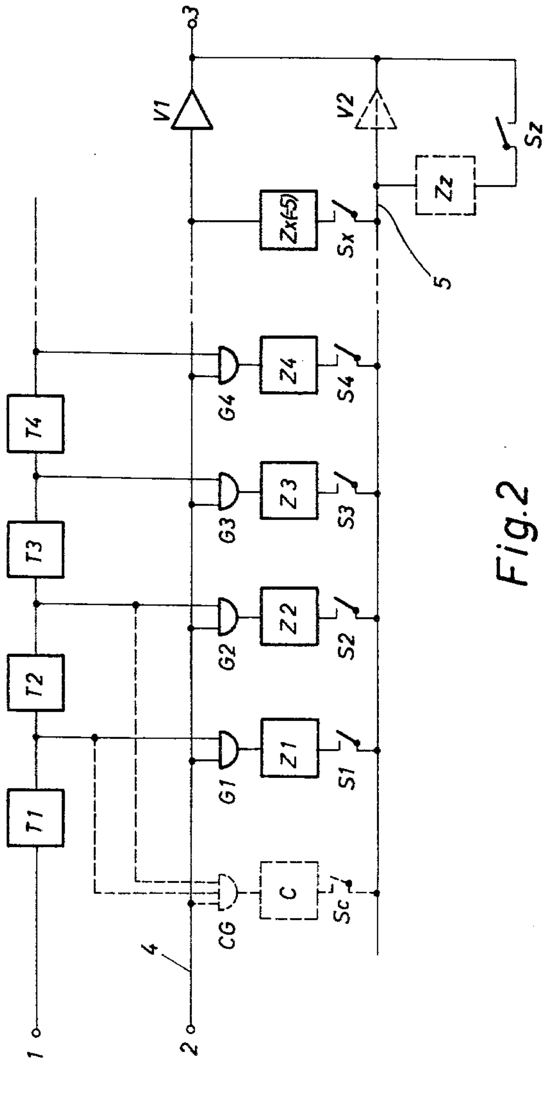
Figure 3:
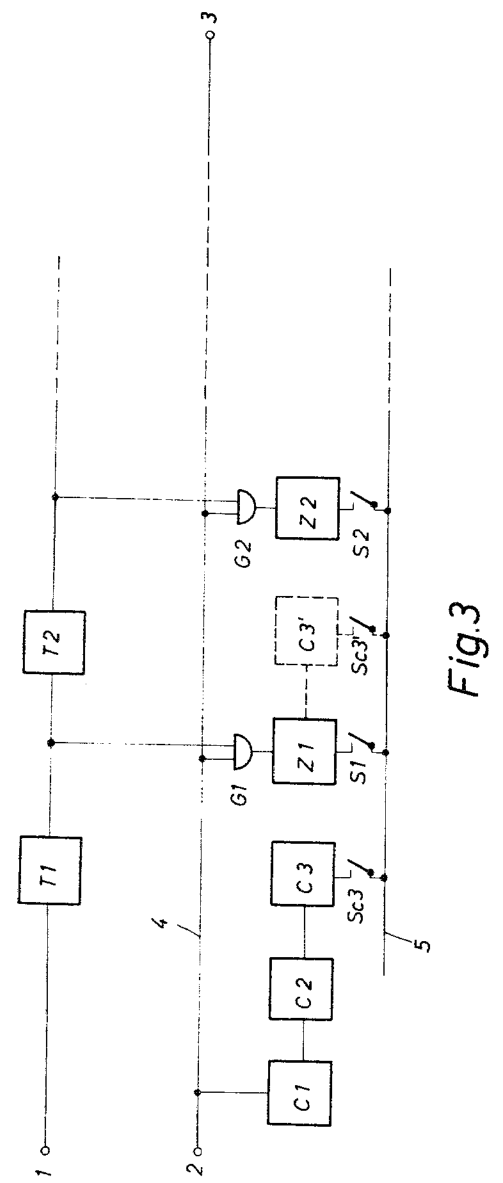

The invention will now be explained in detail with reference to examples of embodiment, and with reference to the accompanying drawings, in which:

FIG. 1 shows the matrix of the message or data digits, and of the check symbols (digits) for a conventional type of error-detecting method, FIGS. 2 and 3 show examples of arrangements according to the invention in the form of block diagrams relating to an error-detecting method in which the check symbols are ascertained in the course of a binary counting, and FIGS. 4 and 5 show diagrams for explaining the mode of operation of the inventive arrangements.

FIG. 1 shows the already discussed matrix of data bits (digits) as resulting, by way of example, in the case of conventional types of methods operating with a certain block length, and in which high redundancies have to be accepted if great Hamming distances are to be obtained.

According to FIG. 2 the data bits (message code) for which the check symbols are to be ascertained arrive at terminal 2 and are coupled along line 4 through decoupling stage V1 to output terminal 3. Synchronously in relation to the succession of the data bits, clock-pulse signals are fed to the terminal 1 in accordance with any conventional method, e.g. derived from the start pulse in cases where a start-stop teleprinter is used. The succession of the clock-pulse signals is stepped down in a binary fashion with the aid of a chain of or series connection of binary dividing stages T1, T2 . . . . The dividing stages T may take the form of a bistable multivibrator as illustrated and described in detail in J. Millman and H. Taub "Pulse and Digital Circuits" 1956, Pages 140–173 and 323–327.

Binary counting stages Z1, Z2 . . . are connected to the data-input line 4, by normally closed (blocked) gate circuits G1, G2 . . . while a final binary counter Z*x* is directly connected to line 4. The gate circuits G are opened by the outputs of the individual dividing stages T, so that the data bits are applied to the counters Z from the line 4 during the open intervals, and are counted by the counters Z in binary fashion. The gate circuits G may also be of the coincidence type. The counting stage Z may take the form of a bistable multivibrator as illustrated and described in detail in the same portions of the above-cited Millman and Taub reference.

The operation of FIG. 2 to obtain a favorable ratio between redundancy and the minimum Hamming distance may best be described by employing a typical example. The data bits are applied to terminal 2 in blocks containing 15 bits, four dividing stages T1, T2, T3, and T4 are connected in series to terminal 1, counters Z equal five with the fifth counter Z (Z*x*) connected directly to line 4 and gates G equal four. Also the clock pulses are synchronized to occur in time with the beginning of each bit position and at time zero (the beginning of the first bit of a bit block) stages T1, T2, T3, and T4 have an output pulse whose value is sufficient to open each of gates G1, G2, G3 and G4.

Remembering that stages T and counters Z operate in a binary fashion, that is, remain in one stage until triggered into their other state, each of counters Z will receive the first bit of the message block for counting and if this bit is a "1," the counters will change their state, for instance, from a low value ("0") to a high value ("1"). Thus, each of counters Z has a counting interval.

Upon the occurrence of the next (second) clock pulse (beginning of second bit of the block), stage T1 will have an output signal value which returns gate G1 to its closed state while the state of stages T2, T3, and T4 and, hence, the state of gates G2, G3 and G4 remains unchanged. Thus, the second data bit cannot be counted by counter Z1 since it is blocked by gate G1, but can be counted by counters Z2, Z3, and Z4.

The third clock pulse triggers state T1 to provide an output signal to open gate G1 and couple the third data bit to counter Z1 for counting. This same output signal of stage T1 triggers stage T2 to produce an output signal value which returns gate G2 to its closed state while the stages T3 and T4 and, hence, the state of gates G3 and G4 remains unchanged. Thus, the third data bit is coupled to counters Z1, Z3 and Z4 for counting.

This above known binary dividing process of stages T1, T2, T3 and T4 will continue until the last bit of the $m$ bit message block with the output of these stages controlling the open and closed conditions of gates G1, G2, G3 and G4 and, hence, the counting interval and non-counting intervals of counters Z1, Z2, Z3 and Z4. It should be remembered in connection with the controlling of the operation of counters Z1, Z2, Z3 and Z4, that Z5 (Z$x$) is connected to input line 4 at all times and, thus, counts all data bits of the block.

The above described operation of the counters Z is illustrated in that portion of FIGS. 4 and 5 whose horizontal rows are designated $m$ data bits 1 through 15. The vertical columns 1 through 5 indicate the operations of counters Z1, Z2, Z3, Z4 and Z5, respectively. The black squares indicate that the respective bit is being counted by the respective counter and a white square indicates that this bit is not being counted. It will be immediately recognized that the black squares of columns 1 through 4 represent an enabling or opening output signal from stages T1, T2, T3, and T4, respectively, and, hence the open condition of gates G1, G2, G3 and G4, respectively. With respect to stages T and gates G, the white squares of columns 1 through 4 associated with the data bits represent no output signal from the associated stage T and the closed condition of associated gates G.

It is expressly mentioned that the numerical statements and, consequently, also the statements regarding the number of employed dividing stages T, gate circuits G and counters Z have only been made by way of example, so that also other numbers can be chosen quite depending on the desired maximum block length.

Therefore, intervals (bit groups) will result for each counter, with the exception of the last one which counts every bit, during which time counting is performed, intervals of equal length during which time no counting is performed by that counter. The number of bits during the counting intervals (which may be referred to as groups) and during the intermediate time intervals, ascends from counter to counter in powers of two starting at $2^0$. Accordingly, and as illustrated in FIGS. 4 and 5, counter Z1 counts the 1st, 3rd, 5th, 7th, 9th, 11th, 13th, and 15th bit, counter Z2 counts the 1st, 2nd, 5th, 6th, 9th, 10th, 13th and 14th bit, counter Z3 counts the 1st, 2nd, 3rd, 4th, 9th, 10th, 11th, and 12th bit, counter Z4 counts the 1st, 2nd, 3rd, 4th, 5th, 6th, 7th and 8th bit, and counter Z5 counts the 1st through the 15th bit.

Consequenty, after the last data bit of the block has been applied to the line 4, each counter Z has a certain reading or counter status depending on the number of "1" bits (unit digits) that have appeared during its counting intervals. These counter readings are interrogated by switches S (S1, S2 . . . S$x$), and transmitted as the parity-check bits for the bit or digit sequences which are applied to the individual counters. The $k(=5)$ parity-check bits are inserted in the lower parts of FIGS. 4 and 5, and are indicated by the numerals 1 through 5 with the black squares representing the time of activating switches S.

Using the above description of the operation of stages T and gates G to establish the counting intervals for counters Z, as illustrated in FIGS. 4 and 5, the input and output signals of counters Z will be indicated in the table below to aid in understanding the operation of switches S and, hence, the manner in which the check bits are generated. For this purpose it will be assumed that the message block is 100011101111100 and that the output signals of counters Z are all in their low ("0") condition at the beginning of the message block. The word "None" in the table is equal to the white squares in FIGS. 4 and 5.

*Table*

| Bit | Bit Condition | Counter Z1 | | Counter Z2 | | Counter Z3 | | Counter Z4 | | Counter Z5 | |
|---|---|---|---|---|---|---|---|---|---|---|---|
| | | Input | Output | Input | Output | Input | Output | Input | Output | Input | Output |
| 1 | 1 | 1 | 1 | 1 | 1 | 1 | 1 | 1 | 1 | 1 | 1 |
| 2 | 0 | None | 1 | 0 | 1 | 0 | 1 | 0 | 1 | 0 | 1 |
| 3 | 0 | 0 | 1 | None | 1 | 0 | 1 | 0 | 1 | 0 | 1 |
| 4 | 0 | None | 1 | None | 1 | 0 | 1 | 0 | 1 | 0 | 1 |
| 5 | 1 | 1 | 0 | 1 | 0 | None | 1 | 1 | 0 | 1 | 0 |
| 6 | 1 | None | 0 | 1 | 1 | None | 1 | 1 | 1 | 1 | 1 |
| 7 | 1 | 1 | 1 | None | 1 | None | 1 | 1 | 0 | 1 | 0 |
| 8 | 0 | None | 1 | None | 1 | None | 1 | 0 | 0 | 0 | 0 |
| 9 | 1 | 1 | 0 | 1 | 0 | 1 | 0 | None | 0 | 1 | 1 |
| 10 | 1 | None | 0 | 1 | 1 | 1 | 1 | None | 0 | 1 | 0 |
| 11 | 1 | 1 | 1 | None | 1 | 1 | 0 | None | 0 | 1 | 1 |
| 12 | 1 | None | 1 | None | 1 | 1 | 1 | None | 0 | 1 | 0 |
| 13 | 1 | 1 | 0 | 1 | 0 | None | 1 | None | 0 | 1 | 1 |
| 14 | 0 | None | 0 | 0 | 0 | None | 1 | None | 0 | 0 | 1 |
| 15 | 0 | 0 | 0 | None | 0 | None | 1 | None | 0 | 0 | 1 |

At the end of the message block, switches S are closed in the sequence indicated in FIGS. 4 and 5 to pass the condition or counter reading to line 5. Thus, in the above example of a message block switch S$x$ passes a "1" to line 5, switch S4 passes a "0" to line 5, switch S3 passes a "1" to line 5, switch S2 passes a "0" to line 5, and switch S1 passes a "0" to line 5.

From the above it will be seen that if the number of counters is so chosen that $2^k \geqq 2m+2$, wherein $k$ indicates the number of check bits, and $m$ indicates the number of data bits, there will be obtained a Hamming distance of 3. In this case it is possible to detect up to 2 errors. In the case of e.g. 360 data bits (which corresponds to one line of a teleprinter system) there are only required 10 check symbols. This represents an extremely favourable ratio between redundancy and Hamming distance.

By adding an additional parity bit for the transmitted check bits there will be obtained a Hamming distance of 4, in which case the corresponding formula reads as follows: $2^k \geqq 4m+4$. To accomplish this in accordance with the present invention an additional binary counter Z$z$, shown by the dash lines in FIG. 2, is provided which is connected to the line 5 via which the check bits are fed to the output terminal 3. This additional binary counter *Zz* is interrogated via an additional interrogating switch *Sz*. Accordingly, and as already mentioned hereinbefore, the counter *Zz* exclusively counts the check bits as delivered by the counters Z1 through *Zx*. However, this only occurs if, between the output terminal 3 and the input of the counter *Zz*, there has been provided the decoupling separating stage V2, also indicated by dash lines in FIG. 2. In FIG. 5 the function of the counter *Zz* is schematically shown by the column *z*. In the course of this the total of the counted primary check bits will result as the 6th check symbol.

As an alternative to this kind of additional parity check of the check bits, the additional counter *Zz* may also be arranged to count all bits, that is, the data bits as well as the check bits. According to the arrangement of FIG. 2 it is then merely necessary to omit the separating stage V2.

The switches S may be of known form, and will usually be electronic switches. Also a method of producing successive closure of the switches, and hence the way in which the counter condition is read, does not need to be explained in detail, because any person skilled in the art is able to design suitable arrangements. The same applies to the resetting of the entire arrangements subsequently to the transmission of a block.

As already mentioned hereinbefore, the arrangement permits the use of variable block lengths. In the case of blocks remaining below the predetermined maximum block length, it is possible to transmit all of the check bits. However, it is also possible to transmit only those check bits which are absolutely necessary for achieving the desired Hamming distance in accordance with the above mentioned formulae, that is, to transmit less check bits in the case of smaller blocks than in the case of larger blocks. The arrangement is suitable for the use in teleprinter connections operating on the start-stop principle as well as in ones operating on the synchronous principle, but may also be employed with other types of data transmissions, e.g. via switched and dialled telephone connections.

According to the examples described hereinabove with reference to FIG. 2, and shown in FIGS. 4 and 5, the Hamming distance amounts to 3 or 4 respectively, which means that no more than 2 or 3 errors respectively can be reliably detected within one block.

If now, on a connection for which arrangements with a certain Hamming distance corresponding to the expected interferences have been provided, the numbers of errors per block exceeding the number of detectable errors still occur, then the cause of such errors is often found in an interruption of the connection or, generally speaking, in the temporary or complete failure of a certain functional part. In this case, however, the errors will appear immediately in succession.

As illustrated by the scheme based on the inventive arrangement described above, it is possible to detect errors appearing in a direct succession, in excess of the limit given by the minimum Hamming distance, with the exception, however, that where there are 4, 8, 12, 16, etc. errors, detection fails.

Further embodiments of the inventive arrangement requiring a small amount of additional apparatus make it possible to close such gaps, or respectively to close all of these gaps under certain conditions. A first example of this is indicated in the left-hand portion of FIG. 2. In this example there is provided another binary counter C, whose input is connected to the input line 4 via a coincidence gate circuit CG. The counting stage C may take the form of a bistable multivibrator as illustrated and described in detail in the same portions of the above-cited Millman and Taub reference. The condition of counter C is read (interrogated) by a switch *Sc* and the condition or state thereof is fed as a further check bit via the line 5 to the output terminal 3. The coincidence gate circuit CG is normally blocked, and is only unblocked upon coincidence of an output pulse of the first dividing stage T1 with an output pulse of the second dividing stage T2. This means that the counter C counts the 1st, 5th, 9th, 13th, etc. data bit, hence every fourth data bit, so that each time there are only three non-counted bits between two consecutive counted bits. Four successive errors are thus detected by that particular check bit delivered by the counter C; accordingly, up to seven such errors can be detected by the complete system. Eight such errors and, consequently, up to 15, can be made detectable by the complete system by providing one additional counter for counting the 1st, 9th, 17th, 25th, etc. bit, and so forth.

FIG. 3 illustrates two embodiments with respect to the case of successive errors extending in the same direction, permitting the closure of the four-error gaps and their relationship to the necessary components of the circuit of FIG. 2. FIG. 3 illustrates only the additional apparatus and the first two counters Z1 and Z2 with their dividers T1 and T2, gates G1 and G2, and switches S1 and S2 of FIG. 2. The solid lines indicate a multistage (in the present example a three-stage) binary counter C1, C2, C3, whose input is coupled to the data-input line 4 and an interrogating switch *Sc3* coupled to the line 5. The check bit obtained at the output of the third stage closes the gap of the number four, that is, causes four errors extending in the same direction to become detectable. Gaps of a higher order can be additionally closed by adding further counting stages, such as C4, etc. to the number of stages of the multistage binary counter C1, C2, C3. Thus, at the output of a fourth stage C4 (not shown) there are detectable besides four, also eight, successive errors extending in the same direction. This multistage counter arrangement may be extended to detect up to 15 successive errors, and so forth.

One stage of this multistage binary counter, namely the stage C1, can be omitted when attaching the stages C2, C3, etc. to the last single binary counter *Zx* (FIG. 2) which, just counter C1 in FIG. 3, is directly connected to the input line 4.

While maintaining the same error-detecting effect, it is possible to save a further stage when attaching a binary counting stage C3' and, if desired, further (not shown) stages C4', etc. either to the counter Z1 (this case is indicated in FIG. 3 by the dashlines: binary counting stage C3' and interrogating switch *Sc3'*), or to the counter Z2.

As regards the case in which the transmission of the check bits is effected in the direction of the data transmission it will be seen from FIG. 2 that the inputs of the gate circuits G or of the counters Z1 through *Zx* are decoupled from the output line 5 for the check bits by decoupling stage V1. Also the input of the counter *Zz* may be decoupled if required, and where the counter *Zz* only counts the check bits, use of the separating stage V2 which is indicated by dashlines in FIG. 2 has already been referred to. The decoupling stage V1 is provided to prevent the check bits from being applied in the backward direction from the output 3, or the point of application of the check bits, and via the line 4 to the counters Z1 through *Zx*.

It will be appreciated in accordance with the objectives of this invention, that in most transmission systems the check bits are generated at the transmitting end: in FIG. 2, the check bit generation can occur at the same time as data transmission occurs, data bits passing to the outgoing line and to the check bit generating apparatus simultaneously, the end of each data block being followed by the sending of the set of check bits generated therefrom. At the receiving end a set of check bits, which should be identical with those produced at the transmitting end, is generated and this newly generated set of check bits is compared with those received with the data block. If the two sets of check bits are found to be identical, the data block is assumed to be correct. However, if the two sets of check bits do not coincide, a repeat request is sent to the transmitting end and the data block is repeated. This continues either until a correct reception occurs, or until a certain predetermined number of attempts have been unsuccessfully made. When the latter condition exists an alarm can be given.

It is also possible, in accordance with the objectives of this invention, to transmit the data block without check bits, in which case the set of check bits generated by the receiving end is sent back to the transmitter. Here it is compared with a stored set of check bits generated from the transmitted data block. If it is found that the two sets of check bits are identical, then the next data block is sent. If not, the last data block is repeated, being prefixed by a signal indicating that it is a repeated block. Here also repeats continue until a correct reception condition is detected, or until an alarm is given after a predetermined number of unsuccessful attempts.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for generating a set of parity check bits for a block of sequential binary data bits comprising:
- a source of blocks of sequential binary data bits;
- a source of clock pulses synchronously related to the data bits of each of said blocks;
- an output terminal coupled to said source of data bits;
- a binary divider including a plurality of individual stages connected in series with respect to each other;
- means coupling the output of said source of clock pulses to only the input of the first of said series connected stages of said binary divider;
- a plurality of binary counters, one of said counters being directly connected to said source of data bits to receive all of said data bits;
- a plurality of gate circuits, each of said gate circuits having
  - an output coupled to a different one of the others of said counters,
  - a first input connected to said source of data bits, and
  - a second input connected to the output of a different one of said stages of said binary divider to control the open periods of said gate circuits to permit each of said others of said counters to receive the bits of different groups of said data bits, said groups received by each of said others of said counters being spaced apart by intervals of equal duration to said received groups, the number of bits in said groups increasing from counter to counter by the powers of two starting at $2^0$; and
- switch means coupled to all of said counters for successive interrogation of the conditions of said counters at the conclusion of a data block and provide a set of check bits for said data block, the number of check bits of said set of check bits determining the number of detectable errors.

2. Apparatus for generating a set of parity check bits for a block of sequential binary data bits comprising:
- a source of blocks of sequential binary bits;
- a source of clock pulses synchronously related to the data bits of each of said blocks;
- an output terminal coupled to said source of data bits;
- a binary divider coupled to said source of clock pulses including a plurality of individual stages;
- a plurality of binary counters, one of said counters being directly connected to said source of data bits to receive all of said data bits;
- a plurality of gate circuits, each of said gate circuits having

- an output coupled to a different one of the others of said counters,
  - a first input connected to said source of data bits, and
  - a second input connected to the output of a different one of said stages of said binary divider to control the open periods of said gate circuits to permit each of said others of said counters to receive the bits of different groups of said data bits, said groups received by each of said others of said counters being spaced apart by intervals of equal duration to said received groups, the number of bits in said groups increasing from counter to counter by the powers of two starting at $2^0$;
- switch means coupled to all of said counters for successive interrogation of the conditions of said counters at the conclusion of a data block and provide a set of check bits for said data block, the number of check bits of said set of check bits determining the number of detectable errors;
- an additional binary counter coupled to the output of said interrogation means to count said set of check bits; and
- an additional switch means for interrogating the condition of said additional binary counter and to provide therefrom an additional check bit for said set of check bits thereby increasing the number of said detectable errors.

3. Apparatus according to claim 2, further including additional means to provide a further check bit for said set of check bits to permit the detection of successive errors greater in number than said detectable errors.

4. Apparatus according to claim 3, wherein said additional means includes:
- an additional gate circuit coupled to said source of data bits and the output of two of said stages of said binary divider;
- another binary counter coupled to the output of said additional gate circuit; and
- another switch means for interrogating the condition of said another binary counter and to provide said further check bit.

5. Apparatus according to claim 4, wherein said two of said stages include the first and second stages.

6. Apparatus according to claim 3, wherein said additional means includes:
- a multistage binary divider coupled to said source of data bits; and
- another switch means coupled to the last stage of said divider for interrogating the condition of said last stage of said divider and to provide said further check bit.

7. Apparatus according to claim 6, wherein said multistage binary divider includes three stages.

8. Apparatus according to claim 3, wherein said additional means includes:
- at least a first binary counter coupled to one of said plurality of binary counters; and
- another switch means for interrogating the condition of said first binary counter and to provide said further check bit.

9. Apparatus according to claim 8, wherein said first binary counter is coupled to the first of said plurality of binary counters.

10. Apparatus for generating a set of parity check bits for a block of sequential binary data bits comprising:
- a source of blocks of sequential binary bits;
- a source of clock pulses synchronously related to the data bits of each of said blocks;
- an output terminal coupled to said source of data bits;
- a binary divider coupled to said source of clock pulses including a plurality of individual stages;
- a plurality of binary counters, one of said counters being directly connected to said source of data bits to receive all of said data bits;

a plurality of gate circuits, each of said gate circuits having an output coupled to a different one of the others of said counters, a first input connected to said source of data bits, and a second input connected to the output of a different one of said stages of said binary divider to control the open periods of said gate circuits to permit each of said others of said counters to receive the bits of different groups of said data bits, said groups received by each of said others of said counters being spaced apart by intervals of equal duration to said received groups, the number of bits in said groups increasing from counter to counter by the powers of two starting at $2^0$;

switch means coupled to all of said counters for successive interrogation of the conditions of said counters at the conclusion of a data block and provide a set of check bits for said data block, the number of check bits of said set of check bits determining the number of detectable errors; and additional means to provide a further check bit for said set of check bits to permit the detection of successive errors greater in number than said detectable errors.

11. Apparatus according to claim 10, wherein said additional means includes:

an additional gate circuit coupled to said source of data bits and the output of two of said stages of said binary divider;

another binary counter coupled to the output of said additional gate circuit; and another switch means for interrogating the condition of said another binary counter and to provide said further check bit.

12. Apparatus according to claim 11, wherein said two of said stages include the first and second stages.

13. Apparatus according to claim 10, wherein said additional means includes:

a multistage binary divider coupled to said source of data bits; and another switch means coupled to the last stage of said divider for interrogating the condition of said last stage of said divider and to provide said further check bit.

14. Apparatus according to claim 10, wherein said additional means includes:

at least a first binary counter coupled to one of said plurality of binary counters; and another switch means for interrogating the conditions of said first binary counter and to provide said further check bit.

15. Apparatus according to claim 14, wherein said first binary counter is coupled to the first of said plurality of binary counters.

References Cited by the Examiner

UNITED STATES PATENTS

| | | | |
|---|---|---|---|
| 2,956,124 | 10/1960 | Hagelbarger ------- | 340—146.1 |
| 3,092,807 | 6/1963 | Reach ------------ | 340—146.1 |

ROBERT C. BAILEY, *Primary Examiner.*

MALCOLM A. MORRISON, *Examiner.*